United States Patent [19]

Ramachandran et al.

[11] Patent Number: 4,701,309

[45] Date of Patent: Oct. 20, 1987

[54] METHOD OF OPERATING A HEAP LEACH FOR RECOVERING URANIUM AND VANADIUM

[75] Inventors: Sundaresan Ramachandran, Tonawanda, N.Y.; David O. Skiles, Grand Junction, Colo.; Donald J. Hansen, Lewiston, N.Y.

[73] Assignee: Umetco Minerals Corporation, Del.

[21] Appl. No.: 676,843

[22] Filed: Nov. 30, 1984

[51] Int. Cl.$^4$ .................... C01G 43/00; C01G 31/00
[52] U.S. Cl. .......................... 423/20; 423/68
[58] Field of Search .................... 423/17, 18, 20, 68

[56] References Cited

U.S. PATENT DOCUMENTS 3,777,004 12/1973 Lankenau et al. ............... 423/20
3,808,306  4/1974 Smith et al. .................... 423/20
4,017,309  4/1977 Johnson ......................... 423/20

OTHER PUBLICATIONS

Merritt, "The Extractive Metallurgy of Uranium", pp. 112–119, Colorado School of Mines Research Inst. (1971).
Zambrana et al, "Reprocessing of Uranium Tailings by Heap Leaching", 1980 Mining Yearbook, pp. 141–149, Colorado Mining Association (1980).
McLean, "The Technique of Acid Pagging and Curing of Ores", Atomic Energy Div., Explosives & Mining Chemicals Dept., American Cyanamide Co., (Jul. 27, 1954), 13 pp. plus 3 apendices.

Primary Examiner—Edward A. Miller
Attorney, Agent, or Firm—N. L. Balmer

[57] ABSTRACT

Method of operating a heap leach for leaching uranium and vanadium from a uranium-vanadium bearing ore formed into a relatively tall heap from a mixture of coarsely crushed ore and concentrated sulfuric acid which involves leaching the heap in sections with each section leached in multiple cycles following a predetermined procedure in which the heap is first leached with dilute acid followed by a strong acid application. The product effluent from the strong acid application is recycled a multiple number of times and advanced to the next section. Each section is then washed with fresh water.

7 Claims, 1 Drawing Figure

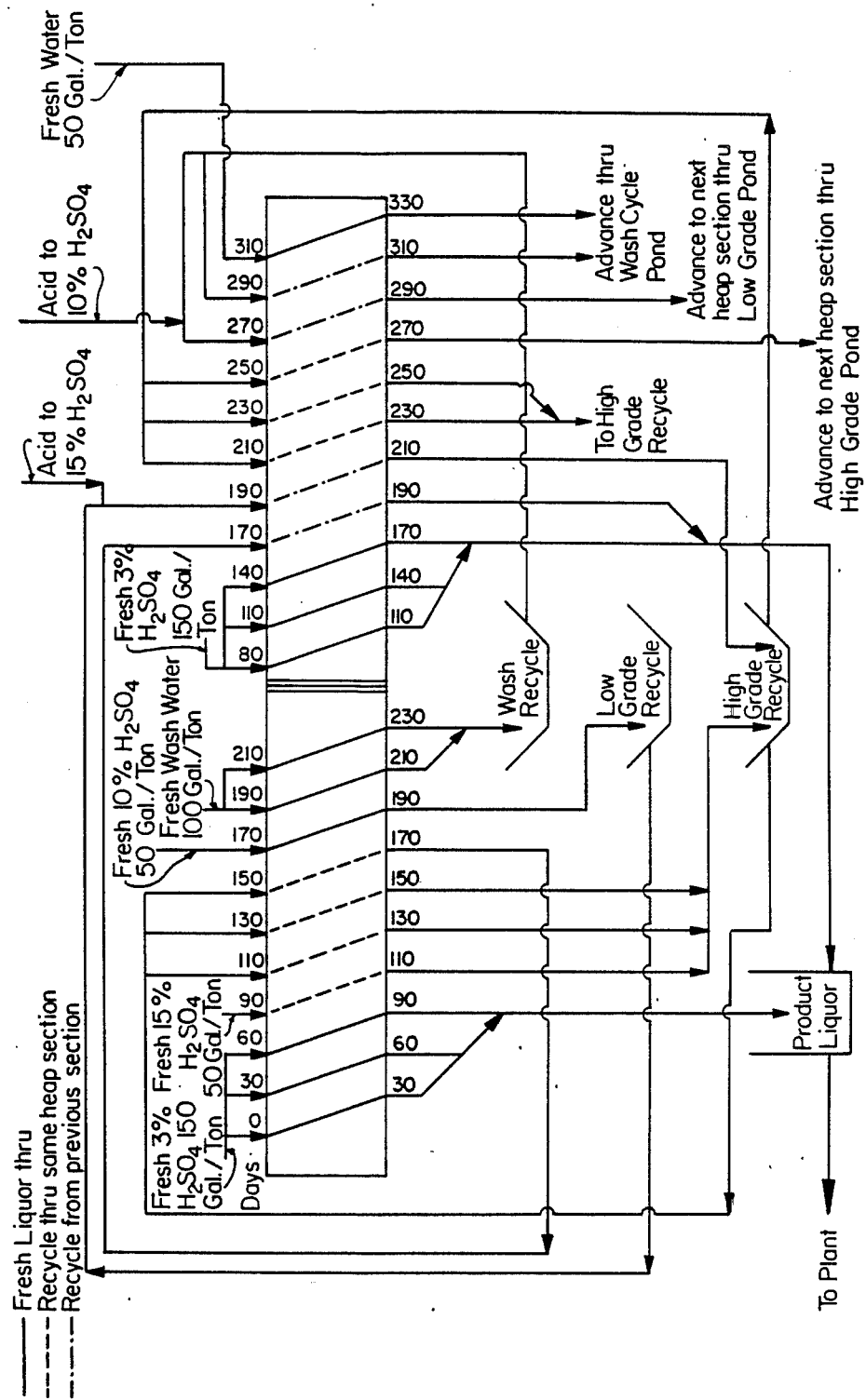

METHOD OF OPERATING A HEAP LEACH FOR RECOVERING URANIUM AND VANADIUM

This invention relates to a method of operating a heap leach for leaching a uranium-vanadium bearing ore to maximize the combined recovery of uranium and vanadium.

Heap leaching is a conventional method for economically extracting metals from low grade ores. It simply involves piling raw ore, taken directly from an ore deposit, into very large heaps which vary in height. The heap is formed upon a prepared relatively flat base formed from a composite of materials impermeable to the leach solution. The leaching solution is introduced upon the top of the heap and percolates down through the heap. The effluent liquor passes into perforated drain pipes arranged on the surface of the base beneath the heap. The drain pipes direct the effluent liquor into a header for transport to a processing plant where the metal values are separated from the effluent and recovered. Because the heap drains very well, unlike a conventional tailings pond, the heap can be left, in situ, as an environmentally acceptable tailings site and any required reclamation work can be done immediately after the extraction is completed.

Although heap leaching has been successfully used to recover metal values such as copper, gold, silver and uranium, the heap leaching process is not, at present, a commercially viable method for recovering vanadium. Since many ore deposits which contain uranium, also contain significant quantities of vanadium, such as the sandstone deposit of the Colorado Plateau, it would be desirable to use the heap leaching process to recover vanadium ore primarily in combination with the recovery of uranium.

In a corresponding companion application, U.S. Ser. No. 676,844, filed on even date herewith, a method of heap leaching is disclosed to permit the recovery of both uranium and vanadium from uranium and vanadium bearing ores at high extraction yields. The method teaches how to overcome a problem of precipitation of solids from the leach liquor, which was discovered by applicants to be the major inhibiting factor in leaching vanadium and uranium from a uranium and vanadium bearing ore. The precipitated solids plug the inter-particle and interstitial openings in the heap which decreases the rate of percolation. The acid in the leach solution reacts with the acid consuming materials in the ore which, in turn, causes an accompanying increase in the pH of the liquor thereby decreasing the solubility of dissolved solids. In fact some of the solubilized vanadium reprecipitates and will not readily go back into solution. In accordance with the teaching in the corresponding companion application, as above identified, the precipitation of solids and the accompanying increase in pH can be prevented by premixing concentrated $H_2SO_4$ with pre-crushed raw ore before placement in the heap. The quantity of premixed acid must be sufficient to substantially neutralize the acid consuming materials in the ore leaving the mixture in an agglomerated dry condition with less than a 20% liquid content.

The present application teaches how to operate a heap leach to maximize the combined recovery of vanadium and uranium at maximum efficiency independent of the recovery procedure for extracting the elemental metal values from the effluent.

The following is a detailed description of the present invention which should be read in conjunction with the accompanying single FIGURE representing the preferred operating schedule for the heap leach.

The critical parameters of the method of the present invention for operating a heap leach to extract both uranium and vanadium values from a uranium and vanadium bearing ore include the following: (1) the consumption of acid; (b) the concentration of sulfate in the pregnant liquor issuing from the heap and (c) the free acid content of the pregnant liquor. It is to be understood that the heap must be formed applying the principles taught in the companion patent application, U.S. Ser. No. 676,844, in order to avoid the precipitation of solids within the heap.

In the practice of this invention, the ore sample should initially be coarsely crushed to a particle size range of between about 1 to 2 inches by Down and then pre-mixed with concentrated sulfuric acid of about 93% to form an agglomerated mass. The crushed ore should initially by moistened with water or low sulfate solution before the sulfuric acid is added. The agglomerated ore mixture is then piled onto an impermeable heap base until the desired height is reached in a range preferably between 14 to 50 feet tall. At this height the heap can be left, in situ, for reclamation after the leaching operation is completed.

Increasing vanadium extraction from the heap is realized with increasing acid consumption. This was proven using, as an example, a fourteen foot by two foot diameter ore column formed from a uranium vanadium ore deposit in the Colorado Plateau. The cumulative vanadium recovery was found to be linearly proportional to the acid consumed in the heap. For any given grade of ore there is a maximum practical level of metal recovery beyond which the recovery process is too time consuming and the leach solution concentration too low to justify continuing the heap leaching operation. The following Table I shows the linear relationship between the extraction of vanadium and the level of acid consumed for the 14 foot column of Colorado Plateau ore used in the above noted example. The ore was coarsely crushed and preacidified with concentrated sulfuric acid in accordance with the procedure as earlier explained and as more fully disclosed in connection with the companion application, U.S. Ser. No. 676,844.

TABLE I

| $H_2SO_4$ Consumed lb/Ton | Cumulative $V_2O_5$ Recovery % |
|---|---|
| 158 | 21.5 |
| 190 | 46.5 |
| 208 | 61.2 |
| 224 | 73.8 |
| 238 | 79.0 |
| 244 | 83.2 |
| 251 | 87.8 |

Optimum recovery of vanadium as indicated in the foregoing Table I is realized when about 250 lbs/Ton of acid is consumed. Acid must be added to the heap to cause this level of acid consumption on a scheduled basis to avoid an excessive build-up in sulfate concentration and to maintain a sufficient level of free acid in the leach liquor to avoid reprecipitation of solids within the heap. If the sulfate concentration in the effluent liquor directed to the plant exceeds 150 gms/liter, subsequent processing could be adversely affected. In addition, the acid level in the leach liquor must be sufficient to insure a pH of below 2.5 and preferably between 1 and 2 to avoid the reprecipitation of vanadium.

The heap is leached in sections with the size of each section determined in advance from the required output of leach liquor as is well known to those skilled in the art. A schedule for operating a heap in multiple sections following the principles of the present invention is depicted in FIG. 1 using only the first two sections for illustrative purposes.

To assure maximum recovery of uranium and vanadium at maximum efficiency each section of the preacidified heap is leached in multiple cycles. For the first cycle, fresh sulfuric acid solution is used within a range of between 1 to 5% $H_2SO_4$, with 3% being preferred. The rate of acid addition to the heap should be controlled to allow $CO_2$ generated from the reaction of acid with carbonates to escape. The rate of acid addition should be slow enough to allow the acid to soak through the heap and solubilize vanadium. An average rate of about 2 gal/$Ft^2$/day is satisfactory for the first cycle with subsequent cycles applied at an average flow rate of 3 gal/$Ft^2$/day. The acid solution is preferably applied by spraying it on the heap.

The first 150 gal. of product liquor per ton of ore will satisfy the three conditions of sufficient uranium and vanadium concentrations, satisfactory sulfate levels and the proper pH range to be fed directly to the plant. This first 150 gal/ton of product liquor completes the first spray cycle and is depicted in FIG. 1 as three 50 gal/ton passes with each pass completed in about thirty days. Product liquor from the first cycle is sent directly through an output liquor sump to the plant where it is processed using conventional processing methods for separating the uranium and vanadium values.

A second spray cycle is started upon completion of the first spray cycle using a stronger sulfuric acid solution relative to the concentration used in the first spray cycle. The second spray cycle is started with a fresh sulfuric acid solution of between 10 to 20% $H_2SO_4$ preferably 15% $H_2SO_4$. At least about 50 gal/ton should be processed in the second spray cycle. The product liquor from the second spray cycle is collected in a high grade recycle pond and recirculated through the heap at intervals of between 10 to 30 days preferably 20 days until at least two to four passes through the heap are completed. In the schedule of FIG. 1, three passes are used with the fourth pass preferably advanced through the second section of the heap before it is fed to the product liquor sump for transport to the plant. In this way, the free acid content and pH of the product liquor is regulated. This liquor is fed to the second section of the heap in coincidence with completion of the first spray cycle in the second heap section. A multiple number of recirculated passes of acid solution of sufficient strength through each heap section is necessary to cause the required consumption of acid in the corresponding heap section, i.e., 250 lbs/ton per section.

An optional but preferred addition of acid is made to the first section of the heap following the second spray cycle to assure that all of the recoverable uranium and vanadium have come out of the heap section. The final 50 gal/ton may typically be at a concentration of between 5 to 12%, preferably 10%, with the liquor effluent fed to a low grade pond. This low grade product liquor from the low grade pond is advanced to the second section as the start of the second cycle, after having been adjusted to 15% $H_2SO_4$ concentration. If this optional but preferred 50 gal. solution/ton is not used, then fresh water may be added to the first section which will subsequently be advanced to the second section after being adjusted to 15% $H_2SO_4$ concentration.

The higher concentrated sulfuric acid solution passes into the high grade recycle pond for multiple recycling through the second heap section in a manner equivalent to the corresponding recycling operation in the first heap section and from whence the high grade product liquor is advanced to the next heap section in succession (not shown). The treatment in each successive heap section is identical to the treatment in the preceeding heap section. Accordingly, the second heap section is started on day 80 with a first spray cycle using a fresh 3% $H_2SO_4$ solution in three 50 gallon per ton passes. The first spray cycle in the second heap section is completed on day 170 coincident in time with the completion of the second spray cycle in the first heap section. A second spray cycle is started on day 190 following the 50 gallons per ton advance from the first heap section. The second spray cycle is recycled through the second heap section three times with the fourth pass advanced to the third section of the heap, etc.

The final process step for each heap section is a fresh water wash cycle which is intended to pick up any remaining dissolved vanadium in the heap and to displace the remaining acid. Each heap section is preferably washed with 100 gal/ton wash water with the effluent passed into a wash cycle pond the output of which is fed into the next section of the heap in succession as the first 50 gallon per ton wash followed by a 50 gallon per ton fresh water wash to form the 100 gal/ton wash water. Under ideal conditions the total liquor going to the plant will be 200 gallons per ton with a 50 gallon per ton residue left in the heap.

In each heap section, the first spray cycle produces a substantial recovery of uranium while the first and second spray cycle will account for a maximum recovery of vanadium. The second spray cycle is, however, first passed from the first heap section into the high grade product liquor pond from whence it is passed into the subsequent heap section in succession before processing in order to maintain control over the liquor pH, the sulfate concentration and the free acid level.

We claim:

1. A method of operating a heap leach for leaching uranium and vanadium from a uranium-vanadium bearing ore formed into a relatively tall heap from a mixture of coarsely crushed ore and concentrated sulfuric acid which comprises leaching the heap in sections with each section being leached in multiple cycles in accordance with a leaching operation comprising the steps of:
    (a) applying a dilute solution of between 1 to 5% sulfuric acid to the first section at a first predetermined average flow rate over a first predetermined time period;
    (b) directing the leach liquor output from step (a) into a product liquor sump for direct delivery to a processing plant for substantially extracting uranium values;
    (c) applying a substantially stronger acid solution of between 10 to 20% $H_2SO_4$ to the first section upon completion of step (a);
    (d) directing the leach liquor output from step (c) into a high grade recycle pond;

(e) recycling the leach liquor from the high grade recycle pond through the first section a predetermined multiple number of times with the last cycle advanced from the first section into the second section in substantial time coincidence with the completion of the dilute acid application to the second section as set forth in step (g);

(f) directing the output leach liquor from step (e) into the product liquor sump for direct delivery to the processing plant for substantially extracting uranium and vanadium values;

(g) applying a fresh dilute acid solution as defined in step (a) to each section in a timed sequence upon substantial completion of the dilute acid application to the preceding section;

(h) directing the leach liquor output of each section from step (g) to the product liquor sump as set forth in step (b);

(i) applying acid solution adjusted to the level as defined in step (c) to each section in succession following the completion of step (g) in each corresponding section respectively;

(j) directing the output leach liquor from step (i) into the high grade recycle pond; and (k) recycling the leach liquor from the high grade pond of step (j) through each section a predetermined multiple number of times with the last cycle passed through the next section in succession before being sent to the product liquor sump in accordance with step (f).

2. A method of operating a heap leach as claimed in claim 1 further comprising regulating the acid concentration in steps (c) and (i) respectively, to control the free acid content and pH of the output leach liquor from each section.

3. A method of operating a heap leach as claimed in claim 2 further comprising controlling the number of recycle passes through the heap to establish a predetermined consumption of acid through the heap and monitoring the total consumption of acid until a predetermined level is reached corresponding to a desired maximum recovery of vanadium for any given grade of ore.

4. A method of operating a heap leach as claimed in claim 3 wherein the acid consumption is monitored until a predetermined amount of acid is consumed with said predetermined amount of acid based on the type of ore.

5. A method of operating a heap leach as claimed in claim 3 further comprising applying additional acid to each section of heap following the recycling of the leach liquor from the high grade recycle pond of step (k) to assure that all of the recoverable uranium and vanadium have been extracted from each heap section respectively; directing the output of this leach solution to a low grade pond and advancing to the next successive heap section with the application of the strong acid solution of step (i).

6. A method of operating a heap leach as claimed in claim 5 further comprising applying a fresh water wash solution to each heap section in succession; directing the water wash effluent into a wash recycle pond and advancing the water wash effluent from the water wash pond into the next successive heap section at the required acid concentration in advance of the application of a fresh water wash solution.

7. A method for operating a heap leach to recover uranium and vanadium values from a uranium and vanadium-bearing ore which is provided as a relatively tall heap, said ore being coarsely crushed and contacted with concentrated sulfuric acid, said heap having a plurality of sections comprising for at least one section the sequence of:

(a) first, applying a dilute solution of between 1 to 5 percent sulfuric acid to said section at a rate and time sufficient to provide a uranium-containing leach liquor which also contains vanadium suitable for processing without precipitation of vanadium-containing salts in the section of the heap, and providing said uranium-containing leach liquor for processing;

(b) second, applying a finished vanadium-containing leach liquor obtained by the process set forth in step (d) from another section of the heap to produce a vanadium-containing leach product which also contains uranium and providing said vanadium-containing leach product for processing; and (c) third, applying a substantially stronger acid solution of between 10 to 20 percent sulfuric acid to said section to provide a vanadium-containing leach liquor which also contains uranium; and (d) recycling the vanadium-containing leach liquor through said section to provide a finished vanadium-containing leach liquor upon removing a desired portion of vanadium values contained in the ore.

\* \* \* \* \*